United States Patent

[11] 3,599,067

[72] Inventor Bernard J. Wallis
25200 Trowbridge Ave., Dearborn, Mich. 48124
[21] Appl. No. 12,271
[22] Filed Feb. 18, 1970
[45] Patented Aug. 10, 1971

[54] OVERLOAD DISCONNECT ARRANGEMENT
19 Claims, 5 Drawing Figs.
[52] U.S. Cl. .................................................... 318/475,
64/29, 192/56, 192/150
[51] Int. Cl. .................................................... H02h 7/085
[50] Field of Search .......................................... 318/469,
475; 192/.56, 150; 64/29

[56] References Cited
UNITED STATES PATENTS
2,730,666 1/1956 Cohen et al. .................. 318/475
2,757,327 7/1956 Oliver ............................. 318/475 X
3,252,303 5/1966 Weasler et al. ................ 64/29

Primary Examiner—Oris L. Rader
Assistant Examiner—H. Huberfeld
Attorney—Barnes, Kisselle, Raisch & Choate ABSTRACT: A safety overload disconnect arrangement between a pair of coaxial driving and driven rotary members which includes a plurality of axially spring-biased bearing balls mounted on one of the members and spaced circumferentially around the axis of rotation thereof. The balls engage in registering sockets on the other member to yieldably couple the members together for rotation in unison. In response to a predetermined overload on the driven member the bearing balls retract from the sockets on the other member and thereby permit the driving member to rotate relative to the driven member. The driving member is adapted to be rotated by electrically controlled means connected to a power source through a circuit completed through a pair of annular slip rings on one of the members, each slip ring being connected with an axially extending brush. When the two members are in coupled relation the two brushes make contact with a contact plate on the other member to complete the circuit to the control means and, when the two members rotate relative to each other in response to an overload on the driven member, the brushes move out of registration with the contact plate and thus interrupt the circuit to the control means and stop the driven member.

PATENTED AUG 10 1971

INVENTOR
BERNARD J. WALLIS

BY
Barnes, Kisselle, Raisch & Choate
ATTORNEYS

INVENTOR
BERNARD J. WALLIS

INVENTOR
BERNARD J. WALLIS

BY
Barnes, Kisselle, Raisch & Choate
ATTORNEYS

3,599,067

OVERLOAD DISCONNECT ARRANGEMENT

This invention relates to a safety overload disconnect arrangement for releasably coupled driving and driven members.

In many mechanisms which are electrically controlled a driving member and a driven member are releasably connected such that in the event of an unduly high load or resistance on the driven member the two members are automatically uncoupled to prevent damage to the mechanism and the control circuit is opened to stop the driving member.

The present invention has for its primary object a safety overload disconnect arrangement of the above described type which is of economical construction and reliable in its operation.

More specifically, the invention contemplates a mechanical overload disconnect wherein the driving and driven members are releasably connected by a plurality of axially spring-biased bearing balls on one of the members engaging circular sockets in the other member in a manner such that the balls tend to rotate upon starting and reversing of the mechanism so as to prevent binding of the balls in the sockets and such that in response to a predetermined overload or resistance on the driven member the bearing balls are adapted to retract from the sockets and thus permit relative movement between the driven and driving members.

The invention also contemplates a safety overload disconnect of the type described which includes an electrical disconnect arrangement in the electrical control circuit in the event of a mechanical overload, the electrical disconnect being of a type which does not involve the use of moving parts and is, therefore, not subject to failure.

IN THE DRAWINGS

Figure 2:
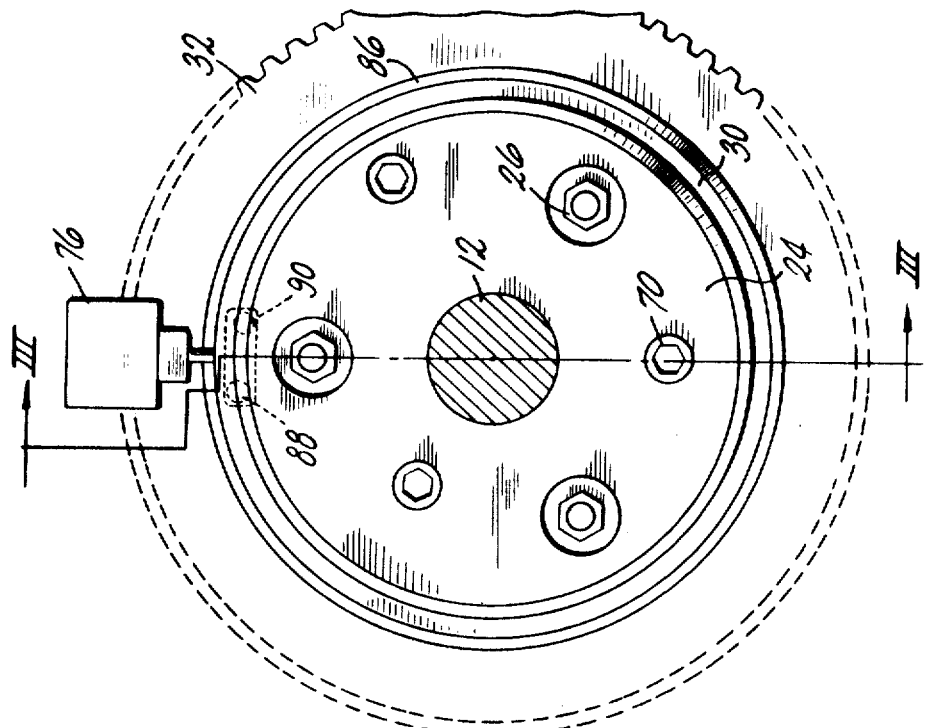
FIG. 2 is an end view of the arrangement shown in FIG. 1 as viewed along the line II–II in FIG. 1.
Figure 1:
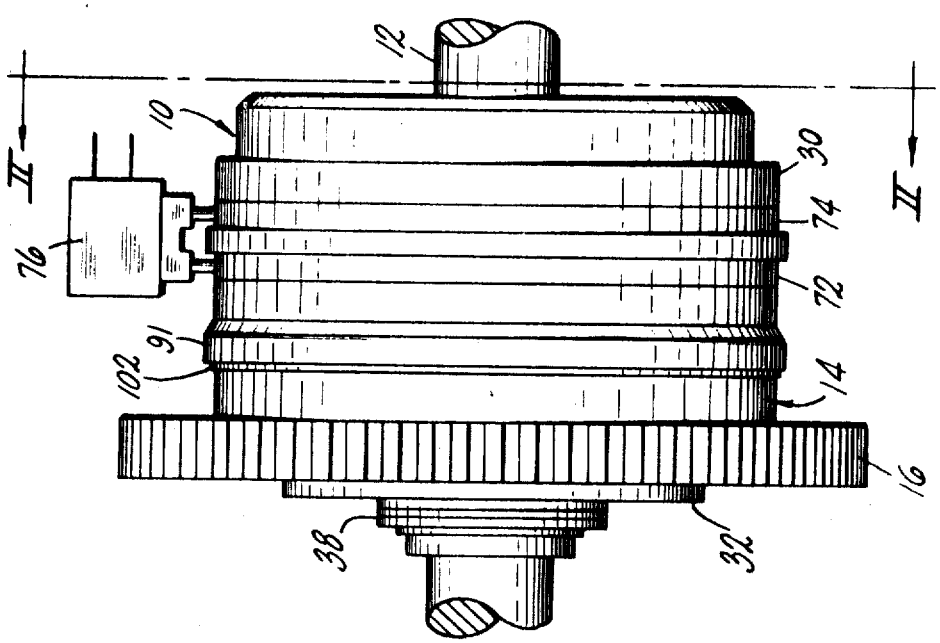
FIG. 1 is a fragmentary side elevational view of a mechanism employing the safety disconnect arrangement of this invention.
Figure 3:
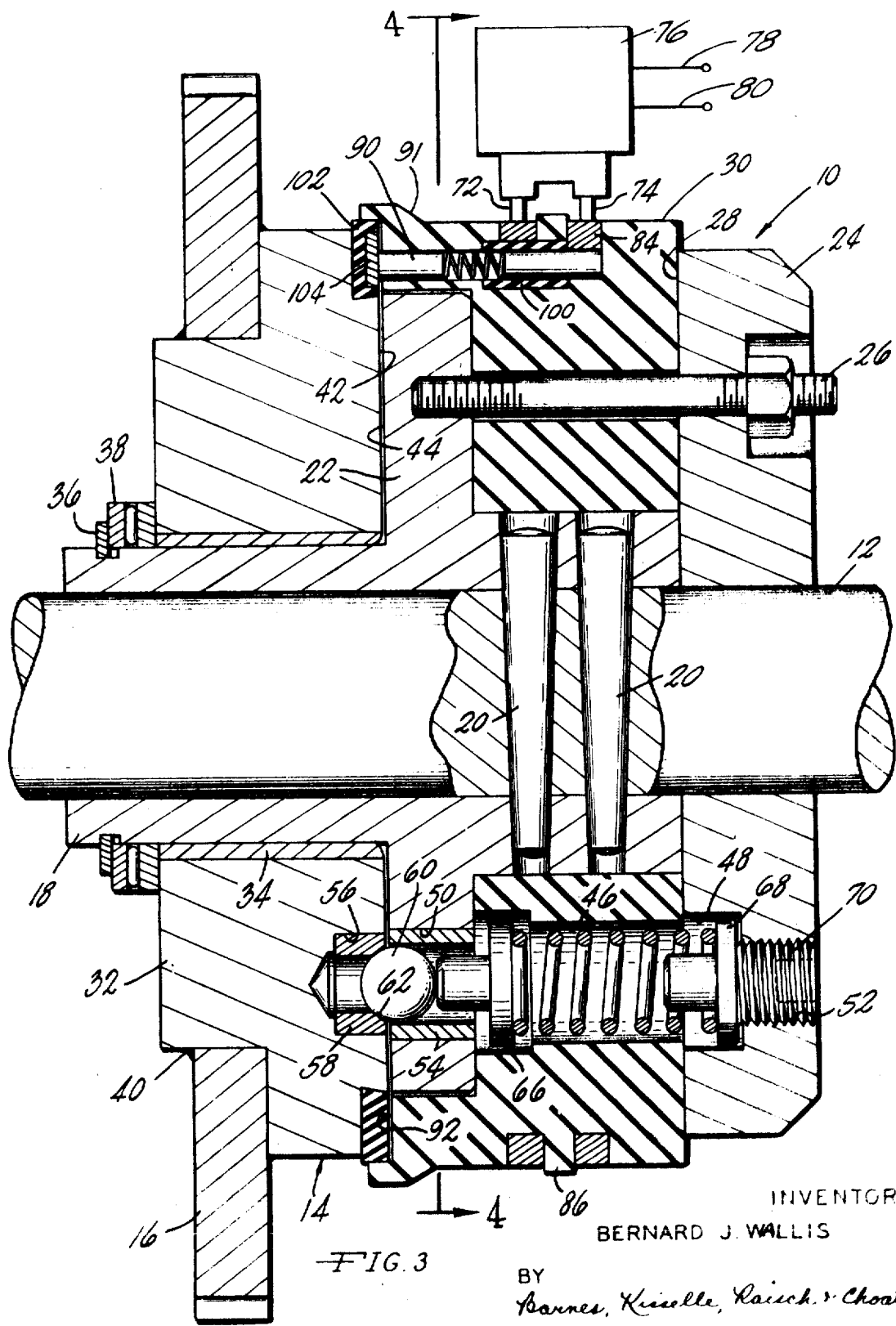
FIG. 3 is a sectional view taken along the line III–III in FIG. 2.
Figure 4:
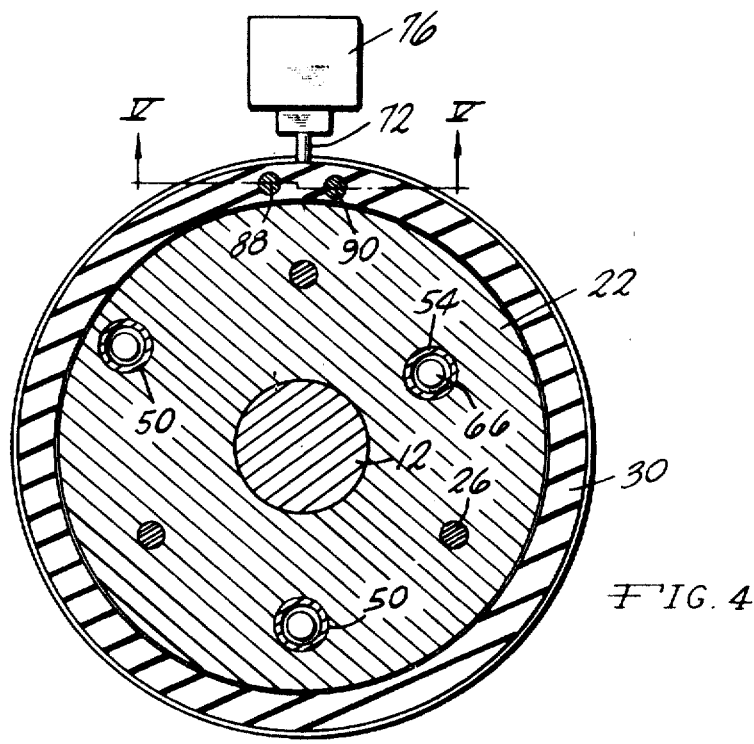
FIG. 4 is a sectional view along the line IV–IV in FIG. 3.
Figure 5:
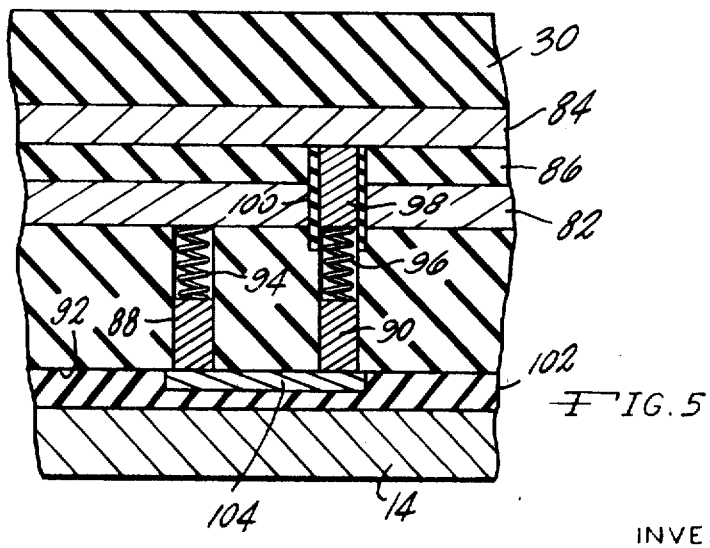
FIG. 5 is a fragmentary sectional view along the line V–V in FIG. 4.

Referring to FIG. 1, the mechanism illustrated includes a driver assembly 10 driven by a shaft 12 and a driven assembly 14 which includes a gear 16 for driving the mechanism to be operated. As shown in FIG. 3, driver assembly 10 includes a sleeve 18 connected to shaft 12 by taper pins 20. Sleeve 18 has a radially outwardly extending flange 22 formed integrally therewith. A backplate 24 is secured to flange 22 by screws 26. The annular groove 28 between backplate 24 and flange 22 is of generally rectangular cross section and is filled by a ring 30 molded of a plastic insulating material, such as urethane, hard rubber, etc.

Driven assembly 14 includes a hub 32 which is journaled on sleeve 18 by a bearing 34 and which is retained axially in place by a snap ring 36 and a needle bearing 38. Gear 16 is suitably mounted on hub 32 as by welding such as shown at 40.

Hub 32 and flange 22 are formed with radial faces 42, 44, respectively, which are located in axially adjacent relation as shown in FIG. 3. Ring 30 has three bores 46 molded therein. At one end bores 46 register with sockets 48 in backplate 24 and at their opposite ends bores 46 register with bores 50 in flange 22. Sockets 48 are formed with a threaded opening 52 and hardened bushings 54 are press fitted in bores 50. Bores 50 are nonsymmetrically located with respect to the axis of shaft 12, (FIG. 3). Hub 32 is formed with three cylindrical sockets 56 which register axially with sockets 50 in flange 22. Hardened steel bushings 58 are press fitted in sockets 56. The inner diameter of bushings 58 is substantially smaller than the inner diameter of bushings 54.

The driving and driven assemblies of the mechanism are releasably coupled by means of a bearing ball 60 disposed within each of the bushings 54 and urged axially into engagement with the chamfered seat 62 on bushings 58 by compression springs 64. Springs 64 are housed in the bores 46 molded in ring 30. At one end each spring 64 bears against a pressure pin 66 which in turn bears against the bearing balls 60 and at its opposite end each spring 64 bears against a pressure pin 68 which is backed up by a socket head screw 70 threaded in opening 52.

The diameter of balls 60 is related in size to the diameter of the chamfered seat 62 of bushings 58 such that bushings 54 contact balls 60 in a plane extending through the center of balls 60 while the chamfered seats 62 contact the surface of balls 60 in a plane offset from the center of the balls.

With the above described arrangement it will be appreciated that when the driver assembly 10 is rotated in either direction a torque is applied to balls 60 by the chamfered seats 62 which tends to rotate the balls. When the direction of rotation of driver assembly 10 is reversed, a torque is applied to the bearing balls 60 which tends to revolve them in the opposite direction. The torque applied to the balls in this fashion assures a constant relative movement between each ball 60 and its seating face 62. This prevents galling and the breakdown of lubricant which would tend to weld or cement the balls against the seats 62 of bushings 58.

With the above described arrangement the pressure with which balls 60 are urged against seats 62 is adapted to be varied by adjusting screws 70. When the resistance to rotation or the load on gear 16 exceeds a predetermined value, the tapered seats 62 urge balls 60 inwardly of bushings 54 against the tension of springs 64 and thus enables driver assembly 10 to rotate relative to driven assembly 14. Since the ball arrangement is not symmetrical relative to the axis of rotation, the driving connection between the two assemblies cannot be reestablished until the two members are relatively rotated to the single predetermined position wherein each ball 60 registers axially with its tapered seat 62 in bushings 58.

In addition to the mechanical disconnect the device of the present invention also provides an electrical disconnect. The electrical disconnect arrangement comprises a pair of carbon brushes 72, 74 which are mounted in a fixedly supported cartridge 76. Electrical conductors 78, 80 are connected with brushes 72, 74 and extend to a low voltage control device such as a relay (not shown) for coupling with the electrical circuit such that when the circuit across brushes 74, 72 is opened, the electrical control circuit is also opened and the mechanism is deenergized.

A pair of copper slip rings 82, 84 engaged by brushes 72, 74 are molded integrally with ring 30 around the periphery thereof. Slip rings 82, 84 are circumferentially continuous and may be machined from tubing. As shown in FIG. 3, slip rings 82, 84 are separated axially by an annular spacer lug 86 molded integrally with ring 30.

The electrical disconnect arrangement includes a second pair of carbon brushes 88, 90 which project axially through the axially extending rim 91 and radially extending face 92 of ring 30. Brush 88 makes electrical contact with slip ring 82 through a spring 94 and brush 90 makes electrical contact with slip ring 84 through a spring 96 and a copper pin 98 which is brazed or otherwise electrically connected to slip ring 84. The portion of pin 98 extending axially through slip ring 82 is surrounded by an insulating sleeve 100.

Around the outer peripheral portion of hub 32 there is molded an insulating ring 102 in which is embedded a copper contact plate 104. Plate 104 is located circumferentially on insulating ring 102 so that it forms bridging contact between brushes 88 and 90 when each of the bearing balls 60 is in seated engagement with its respective bearing seat 62 in bushings 58. Thus, when the mechanism encounters an overload sufficient to cause balls 60 to retract out of engagement with the bearing seats 62, the drive between driver assembly 10 and driven assembly 14 is uncoupled and the electrical control circuit is likewise opened by reason of the fact that contact plate 104 shifts circumferentially relative to brushes 88 and 90 so that it no longer makes bridging contact between these brushes.

It will be observed that with the electrical disconnect arrangement illustrated there is no internal wiring and the need for a mechanical disconnect switch having moving parts is avoided. The electrical disconnect arrangement is, therefore, "fail safe" in the sense that any failure of the electrical disconnect will cause the circuit to the driving motor to be opened.

It will also be observed that by utilizing the molded ring 30 a very economical design is provided. Slip rings 82, 84 can be molded in place in ring 30 and the necessary bores and sockets in ring 30 can also be molded. This is particularly true with respect to the bores 46 for housing springs 64. It will be appreciated that the forming of bores 46 by molding them in ring 30 is considerably less expensive than machining these bores in metal. Furthermore, it is desirable to locate the balls 60 adjacent the outer periphery of the driving member as distinguished from adjacent its axis of rotation so that a larger driving force can be obtained with the same spring tension on springs 64. Since the electrical disconnect arrangement is provided around the outer periphery of driver assembly 10 the use of an insulating ring 30 of substantial radial extent between its inner and outer diameters is highly advantageous since it permits housing of springs 64 in an economical manner. Springs 64, it will be observed, are not subjected to any torque; the driving torque is absorbed by bushings 58, balls 60 and bushings 54.

I claim:

1. In combination a rotary driving member, a rotary driven member, means releasably connecting said members coaxially for rotation in unison such that when the load on the driven member is excessive the members are uncoupled and permitted to rotate relative to one another, means forming an electrical control circuit which when closed is adapted to supply electrical energy for controlling the rotation of the driving member, said circuit including a pair of circumferentially continuous slip rings on one of said members electrically insulated from one another, brush means contacting said slip rings and forming part of said circuit, said one member having a pair of brush elements thereon insulated from one another and electrically connected one with each of said slip rings, said other member having a contact plate thereon which when said members are in a predetermined coupled relation is adapted to bridge said brush elements to close said circuit, said contact plate being dimensioned such that when said members shift circumferentially out of said predetermined coupled relation said contact plate moves out of contact with at least one of said brush elements to thereby open said electrical circuit.

2. The combination set forth in claim 1 including an insulating ring on said other member concentric with the axis of rotation of said first member, said contact plate being mounted on said insulating ring such that when said members shift circumferentially out of said predetermined coupled relation said brush elements contact said insulating ring.

3. The combination set forth in claim 1 including an insulating ring on said one member, said slip rings being mounted on said insulating ring.

4. The combination set forth in claim 3 wherein said brush elements are mounted on said insulating ring.

5. The combination set forth in claim 1 wherein said other member has a radially extending face, an insulating ring mounted on said radially extending face concentric with the axis of rotation of said first member, said contact plate being mounted on said insulating ring whereby when said members shift circumferentially out of said predetermined coupled relation said brush elements contact said insulating ring.

6. The combination set forth in claim 5 including an insulating ring on said first member concentric with the axis of rotation thereof, said insulating ring having a radially extending face axially juxtaposed to the insulating ring on said other member, said brush elements extending axially through the radial face of the last-mentioned insulating ring.

7. The combination set forth in claim 1 including an insulating ring on said one member concentric with the axis of rotation thereof, a second insulating ring on the other member juxtaposed to the first insulating ring, said brush elements being mounted on the first insulating ring and said contact plate being mounted on the second insulating ring.

8. The combination set forth in claim 7 wherein said slip rings are mounted on said first insulating ring.

9. The combination set forth in claim 8 wherein the second insulating ring lies within the circular path of travel of said brush elements so that the brush elements engage the second insulating ring in response to relative rotation of the two members.

10. The combination set forth in claim 1 including an insulating ring on said first member concentric with the axis of rotation thereof, said insulating ring having a pair of spaced grooves therein, said slip rings being seated one in each of said grooves.

11. The combination set forth in claim 10 wherein said insulating ring is disposed around the outer periphery of said first member and wherein said grooves are disposed around the outer periphery of the insulating ring, said grooves being spaced apart axially.

12. The combination set forth in claim 10 wherein said brush elements are mounted on said insulating ring, said insulating ring having a radially extending face which is axially contiguous to a radially extending face on said other member, said brush elements extending axially through the first-mentioned radial face and said contact plate being mounted on said radial face of the other member in axial registration with the circle defined by the outer ends of said brush elements at the radial face of the insulating ring.

13. In combination a rotary driving member, a rotary driven member, said members having a pair of radially extending faces which are axially juxtaposed, one of said members having a shaft portion extending coaxially from its radial face, the other member being journaled for rotation on said shaft portion, one of said members having a radially outwardly opening annular groove therein spaced axially from said radial face on said one member and defining a radially outwardly extending flange between one side of said groove and said last-mentioned radial face, a molded ring of insulating material filling said groove, said insulating ring having a plurality of circumferentially spaced, axially extending sockets therein extending to said flange, said flange having a plurality of through bores therein registering axially with said sockets, said radially extending face on said other member having a plurality of sockets therein registering axially with the bores on said flange, means in said bores interengaging said two members to form a driving connection therebetween, spring means in said sockets urging said last-mentioned means into interengaging relation and for enabling said interengaging means to retract in said bores and thereby permit said two members to rotate relative to one another when the force tending to resist rotation of the driven member exceeds a predetermined value, a pair of axially spaced slip rings extending around the outer periphery of said insulating ring, a pair of axially extending brush elements in said insulating ring connected one with each of said slip rings, said radial face of said other member having a contact plate thereon which when the two members are interengaged for driving relation bridges said brush elements to complete a circuit therethrough, said contact plate being dimensioned such that its bridging contact between the two brush elements is broken in response to relative rotation of the two members and means contacting each of said slip rings for completing a circuit to an electrical control means.

14. The combination set forth in claim 13 wherein said brush elements are spaced radially outwardly from said sockets in said insulating ring.

15. The combination set forth in claim 14 wherein said sockets are spaced radially from the axis of rotation of said members a greater distance than from the outer periphery of said member.

16. The combination set forth in claim 13 wherein said interengaging means comprise bearing balls, said bearing balls projecting into the sockets of said other member a distance less than the radius of the bearing balls.

17. The combination set forth in claim 16 wherein the bearing balls extend into the bores in said flange a distance greater than the radius of the bearing balls.

18. The combination set forth in claim 17 including means defining a radially extending flange at the other side of said groove and means threaded in said flange and bearing against the adjacent ends of the springs for controlling the force with which said springs bear against said balls.

19. The combination set forth in claim 18 wherein said last-mentioned flange comprises a disc formed separately from said one member and means extending through said two flanges and said annular ring for retaining the annular ring, the last-mentioned flange and said one member in assembled relation.